Robert J. Russell,
J. Wesley Cable,
Inventors.
Koenig, Senniger, Powers and Leavitt,
Attorneys.

United States Patent Office 3,444,346
Patented May 13, 1969

3,444,346
INDUCTIVE HEATING OF STRIP MATERIAL
Robert J. Russell, North Dighton, Mass., and Joseph
Wesley Cable, Monroe, Conn., assignors to Texas Instruments Incorporated, Dallas, Tex., a corporation of
Delaware
Filed Dec. 19, 1966, Ser. No. 602,716
Int. Cl. H05b 5/08, 9/02
U.S. Cl. 219—10.61                                    15 Claims

ABSTRACT OF THE DISCLOSURE

Moving strip of conductive material capable of being heated by magnetic induction of current therein is passed through alternating magnetic flux emanating from one or more adjustably located conductors extending across the strip. In the flux field surrounding each conductor is a flux concentrating pole structure composed of a series of adjustable pole segments, each series of such segments extending across the strip. When more than one conductor is employed analogously located segments in the various series of segments are ganged for simultaneous adjustments.

Background of the Invention

The art to which the invention belongs is the electrical resistance heating of strip material by the magnetic induction of electric currents therein. In this art inductive heating of moving strip has been carried out by nonsegmented pole structures extending across the strip. This resulted in uneven temperatures across the strip, including the production of excessive edge temperatures. The elimination or at least reduction of such uneven temperatures and more particularly the high edge temperatures constituted a problem.

Summary

The provision in the flux field of each conductor extending across a strip, of adjustable pole segments, whereby a sequence of flux concentrations across the strip may be varied, thereby varying the heating current in the strip so that temperatures reached across the strip may be controlled as desired, including more evenly distributed temperatures to avoid excessive edge heating. Cooling is provided not only for the conductors as heretofore but also for the adjustable pole segments. Provision is made for gang adjustments of the pole segments which have like positions across the strip but located in adjacent banks of the segments.

The invention accordingly comprises the construction hereinafter described, the scope of the invention being indicated in the following claims.

In the accompanying drawings, in which is illustrated one of various possible embodiments of the invention.

Corresponding reference characters indicate corresponding parts through the several views of the drawings. FIGS. 1–11 are schematics illustrating the advance of the invention over the prior art.

Figure 1:
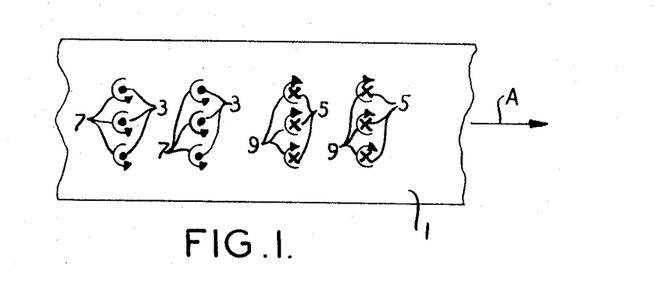
FIGS. 1–5 are views illustrating modes of operation of conventional apparatus to which the invention is applicable.
Figure 2:
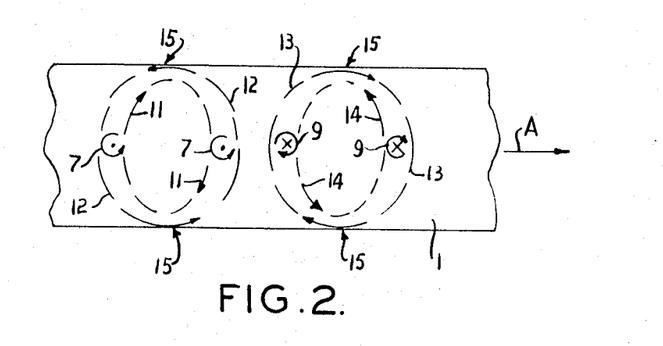

The electrical heating of moving metal strips by transverse alternating magnetic-flux induction has heretofore involved certain difficulties best understood by reference to FIGS. 1 to 7. Numeral 1 illustrates a moving metal strip to be heated as it moves. Movement is accomplished by conventional draw means illustrated by the straight dart A. The metal may be aluminum, copper, steel or the like. Heretofore an alternating magnetic flux field has been directed vertically through the plane of the moving strip. Such an alternating flux field generates eddy currents in the moving strip. The dots 3 in FIG. 1 represent intersections of a number, though not all, of the lines at any one instant of an alternating magnetic flux-field portion passing up through the strip 1 as it moves. The crosses 5 represent the intersections of a number, though not all, of the lines at a corresponding instant, of an alternating magnetic flux-field portion passing down through the moving strip 1. The directions of the resulting instantaneous eddy currents are, according to the right-hand rule known to those in the art, represented by the curved darts. Darts 7 around the intersections 3, for example, are directed counterclockwise, and the darts 9 around the intersections 5 are directed clockwise. It is believed that the paths of the eddy currents taken cumulatively extend across the strip, as represented by the dash lines 11, 12, 13 and 14 in FIG. 2. There is apparently a tendency for these to build up at the edges of the strip, as indicated at numerals 15. This we believe has caused the former disadvantageous so-called edge heating effect. This will be discussed further below.

Figure 3:
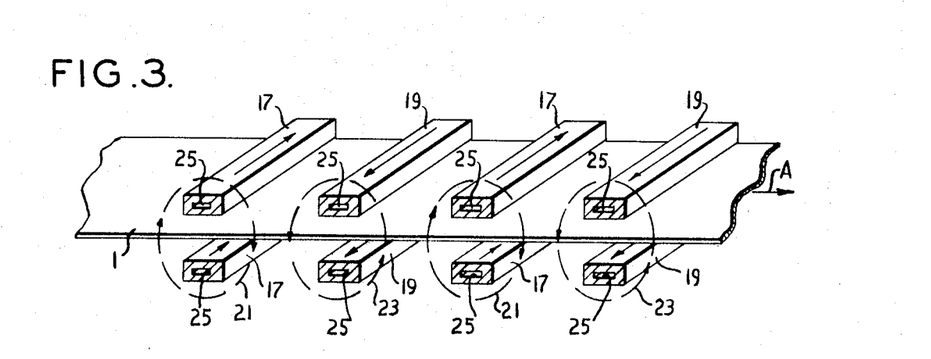

FIG. 3 shows essential parts of conventional electrical circuitry in relation to the moving strip for generating the alternating magnetic flux field such as above referred to. Such circuitry comprises a series of pairs of electrical conductors, sections of which are shown at 17 and 19, the members of each pair of sections being oppositely located above and below the moving strip 1. Alternate pairs 17 and 19 carry substantial currents in opposite directions, as indicated by the straight darts thereon. Known circuitry supplies the voltage for such currents through the conductors 17 and 19. In view of the large current values used, the conductors may be composed of low-resistance OFHC copper and are made hollow, as indicated at 25, for the purpose of carrying a suitable coolant to prevent overheating of the conductors. Illustrative parts of magnetic flux loops generated by the currents are shown by the curved broken darts 21 and 23 (FIG. 3).

Figure 4:
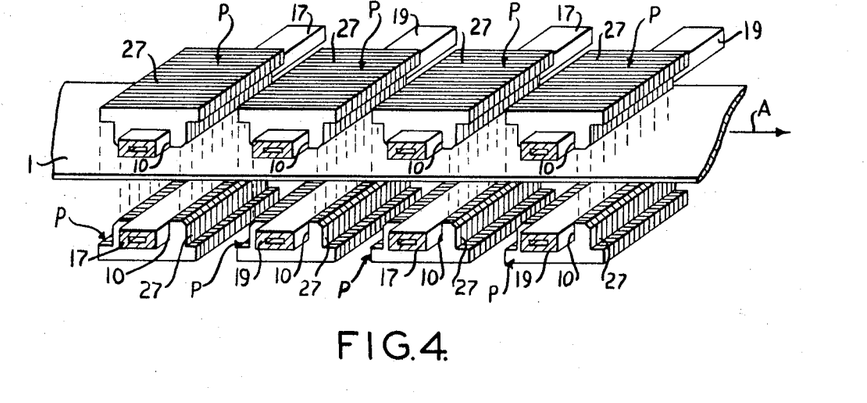
Figure 5:
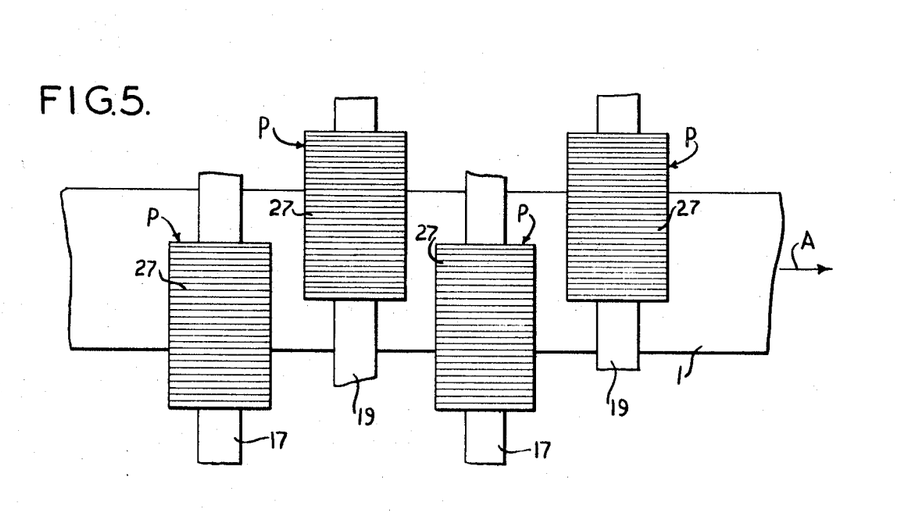
Figure 6:
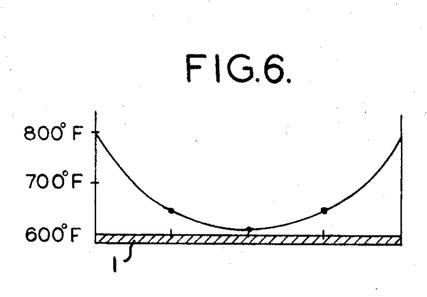
FIGS. 6 and 7 are graphs illustrating certain disadvantageous heating effects of the conventional apparatus.

A characteristic of a magnetic field produced by an arrangement such as above described is that the flux field will stray and attenuate when passing through air which has unit magnetic permeability. This has been minimized by the use of highly permeable pole pieces P. Each pole comprises laminations 27 connected together and partially enveloping the conductors 17, 19, as illustrated in FIG. 4. Such laminations have been composed of silicon-iron, for example, having a magnetic permeability up to 100,000, which served to concentrate the magnetic field that passes through the strip 1, and also to decrease the magnetic reluctance of the path of the magnetic flux, thereby increasing the total number of lines produced per unit of conductor current. The thicknesses of the individual laminations have been in the range of 0.002 inch to 0.008 inch. Each lamination has been stamped in a bridge-shaped configuration providing a notch 10, so as to fit over or under a conductor 17 or 19 as the case may be. The length of each pole piece P has been such as to extend across the width of the strip 1. The conductors 17 and 19 with the laminated pole pieces P, as illustrated in FIG. 4, are referred to in the art as field structures. Such prior field structures have resulted in a transverse temperature gradient across the strip with excessive edge heating such as illustrated in FIG. 6. This graph plots actual temperatures across a former moving strip 1 thus heated. As the graph shows, while the center is at a temperature of approximately 610° F., the edge temperatures are approximately 800° F., amounting to a difference of 190° F., which is undesirable.

Figure 7:
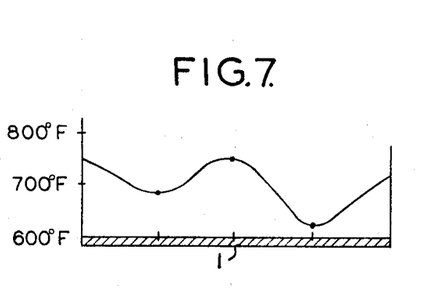

Attempts have been made to overcome the excessive edge heating by providing transverse adjusting means to stagger the laminated pole pieces P and the conductors 17 and 19 so that each extends across only one edge of the moving strip 1. The resulting staggered arrangement is illustrated in plan view in FIG. 5. This arrangement has reduced the edge heating effect to some degree, as illustrated by the graph of FIG. 7, but the temperature gradient across the entire width of the strip was not uniform, involving about a 170° maximum temperature difference. Also, temperatures between the edges and the center of the strip were lower than elsewhere. While such temperature gradients are useful for some purposes, this is not satisfactory for certain more critical strip heating processes requiring more even heating throughout the width and length of the strip.

Figures 8, 9:
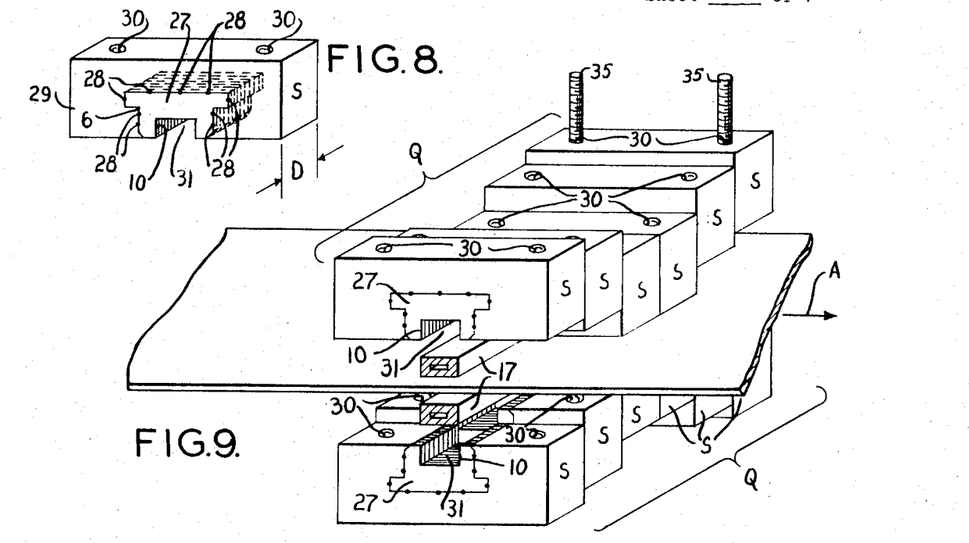
FIGS. 8 and 9 are diagrammatic views illustrating our improved pole segments as used on a single conductor.

FIGS. 8–11 illustrate our improvements on the above arrangements which include segmentation of each pole piece with adjusting means for individual segments. Two such segmented pole pieces are shown in FIG. 9 and each is lettered Q in general. Referring to FIG. 8, it shows one segment S. This comprises a nonmagnetic (copper) holding block 29 about one inch in depth D. The block is prepared with a T-shaped slot 6 extending in the direction of its depth in order to receive a comparatively small group of the highly permeable bridge-shaped laminations such as 27. Each group of laminations is affixed in its slot 6 by any suitable means, as for example by press-fitting and/or staking as at 28. Each group of laminations fills its slot. The aligned notches 10 in the laminations 27 form a groove 31 across the group of laminations in a segment S. This groove 31 is dimensioned to fit around a conductor 17 or 19 with a close but free sliding fit. The result is a bipolar flux-concentrating segment S constituted by the block 29 and its contained group of laminations 27 which may be applied to straddle a conductor 17 or 19 and adjusted relatively thereto in a direction perpendicular to the plane of movement of the strip. As illustrated in FIG. 9, a number of segments S are arranged side by side along each conductor (17 or 19). Thus are formed the segmented pole pieces Q to take the place of the unitary pole pieces such as shown at P in FIG. 4. In FIG. 9 the rows of staggered segments S of a given pole piece Q are shown as being individually positioned for different transverse adjustments relative to a conductor 17 or 19.

Figure 10:
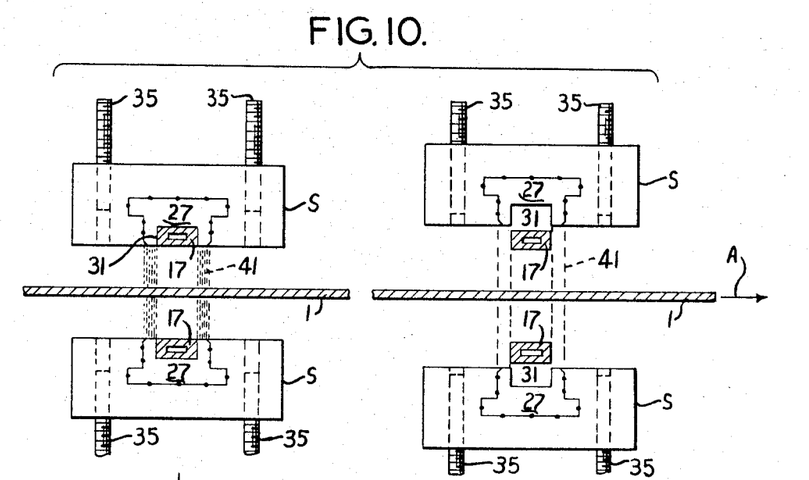
FIG. 10 is a schematic view illustrating the effects of certain adjustments afforded by the invention.

Each block 29 is provided with threaded holes 30 in its nonmagnetic part for the reception of a pair of threaded supporting and adjusting rods 35, two only of which on one segment S are shown in FIG. 9, to avoid confusion in that figure. By turning a pair of threaded supports 35 in a block 29, the position of each segment S relative to its conductor 17 or 19 may be independently adjusted. The effect of this is as illustrated in FIGS. 9 and 10. On the left side of FIG. 10 a pair of opposite segments S have been adjusted toward a pair of conductors 17, for example, so that each of the latter is contained in a groove 31 of a segment S. This has the effect of concentrating the magnetic flux loop 41 through the strip 1. On the right side of FIG. 10 is shown an adjustment of the same pair of segments S which has retracted them from the conductors 17. This attenuates the corresponding flux loop 41. There are various intermediate adjusted positions of each of the segments that may be had for different desired degrees of flux concentration along each row of segments as shown in FIG. 9.

Figure 11:
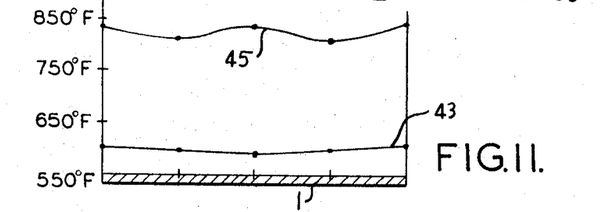
FIG. 11 is a graph illustrating improved heating effects resulting from the adjustments such as illustrated in FIGS. 9 and 10.

When an individual segment S is advanced toward strip 1, the reluctance of the corresponding portion of the magnetic flux circuit 41 through the strip 1 is reduced which increases the total number of lines of magnetic flux and correspondingly increases the production of eddy currents and heating in the localized portion of the strip adjacent that particular segment. When an individual segment S is retracted, the flux field is attenuated, which reduces eddy currents and heating in the localized portion of the strip adjacent that particular segment. Thus by suitably adjusting the individual flux-concentrating segments S perpendicularly to the plane of the strip 1, the uneven and edge heating effects across the strip may be avoided, or are minimized. This is illustrated by the chart of FIG. 11 which shows by the lower graph curve 43 substantially even heating that has been obtained from side to side of a strip by appropriate adjustments of segments S. Graph 45 shows another result which has been obtained by other adjustments of the segments S. Thus it will be seen that, by independent adjustments of individual blocks, various desired temperature gradients may be obtained across a strip as desired, whether even or uneven.

Figure 12:
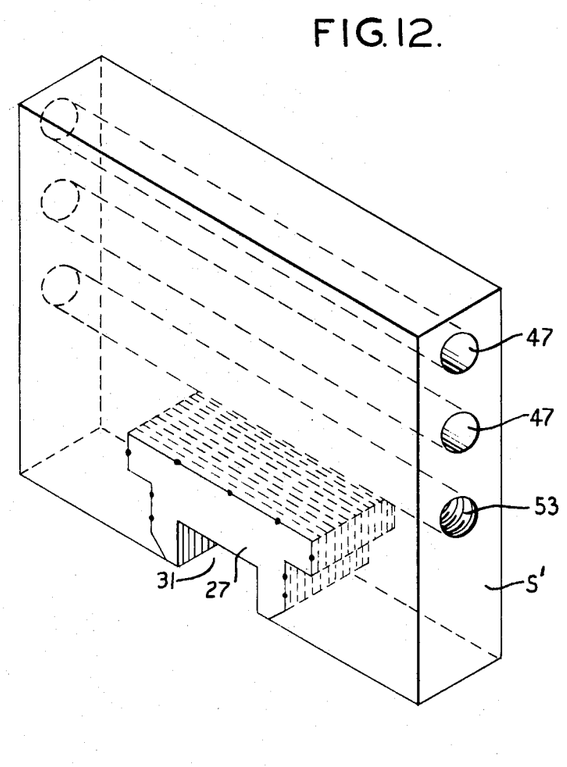
FIG. 12 is a perspective view of a form of pole segment for gang adjustments of segments.
Figure 13:
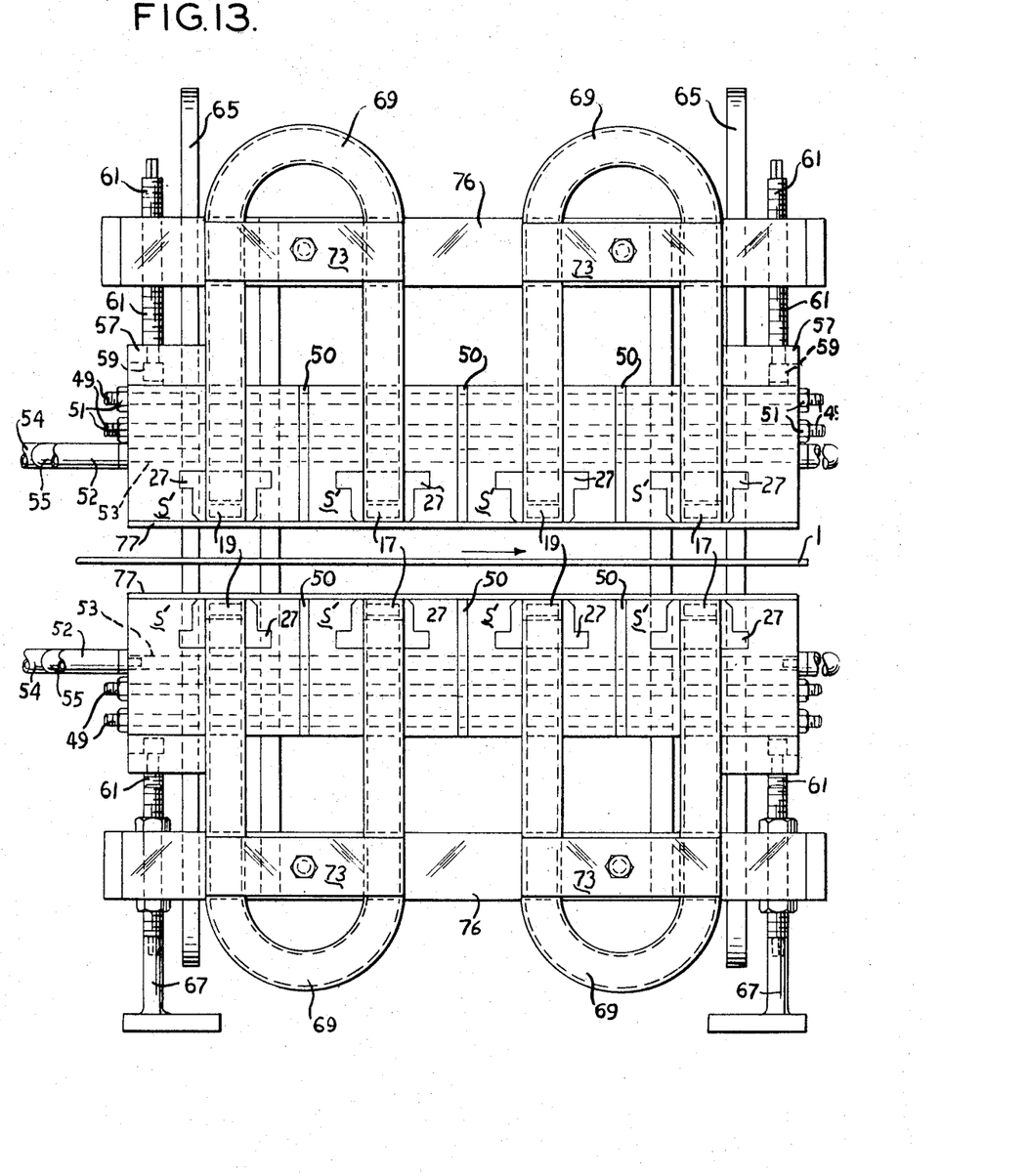
FIG. 13 is a front elevation of a gang-operative form of the invention before segment adjustments have been made.
Figure 14:
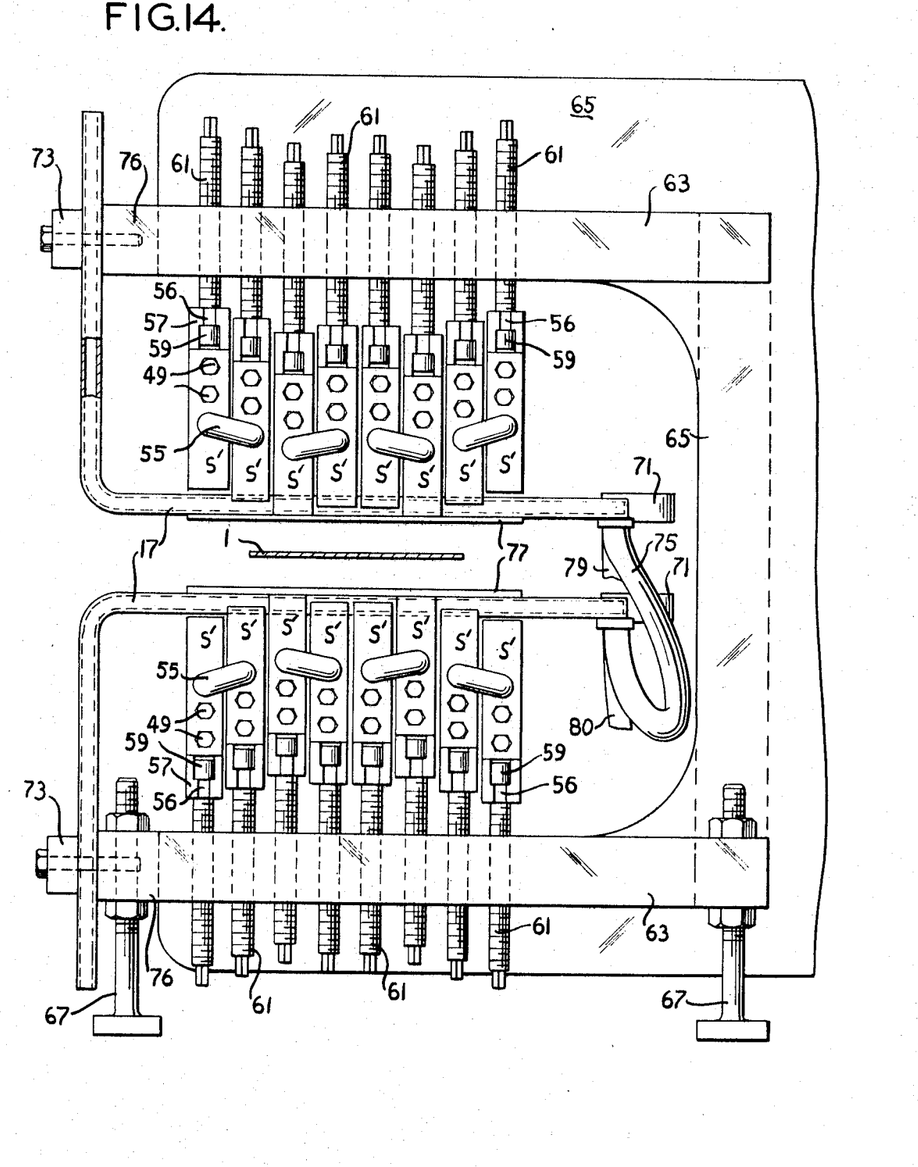
FIG. 14 is a right-hand end view of FIG. 13 after adjustments have been made.

In FIGS. 12–15 are shown arrangements whereby analogously placed segments S′ along adjacent conductors 17 or 19 may be gang operated. In this case a segment S′ of the type shown in FIG. 12 is used. This contains laminations 27 such as above described. Passing through the upper part of each segment S′ is a pair of holes 47 for the reception of insulated draw bolts 49 such as shown in FIG. 13. Bolts 49 carry clamping nuts 51. Thus gangs or assemblies of four each of the segments S′ are held together with strips of insulating packing 50 therebetween. The bolts 49 pass through the packings 50. Each segment S′ is also provided with a coolant passage 53. These passages 53 are connected through suitable openings in the packings 51. Flexible (elastomeric) cross connections 55 are provided to connect adjacent gangs of the segments S′. These cross connections 55 may be constituted by rubber hose with suitable fittings threaded into the threaded end of the endmost segment S′ in a gang (see FIGS. 12 and 14). Flexible coolant inlets and outlets are shown at 52 and 54. FIG. 14 shows eight (for example) gangs of segments, with four segments in each gang as shown in FIG. 13.

Welded to the endmost segment S′ of each gang of the same is a block 57 providing a T-slot 56 for the reception of a head 59 of an adjusting screw 61. There are two lines of adjusting screws 61 as shown in FIGS. 13 and 14. Each line is threaded through an insulated bar 63 on a supporting framework 65 supported on legs 67.

It will be noted from FIGS. 13 and 14 that one arrangement such as above described is provided above the strip 1 and another is in inverted position below the strip 1. Thus, in all, there are four lines of adjusting screws 61. To adjust an assembled gang of the segments S' the screws 61 associated with the blocks 57 at its ends are simultaneously adjusted so that gang of segments S' may be raised or lowered independently of the adjacent gangs. Adjacent segments S' in adjacent gangs are aligned along the hollow reaches 17 and 19 of the conductors which extend across the strip 1.

Figure 15:
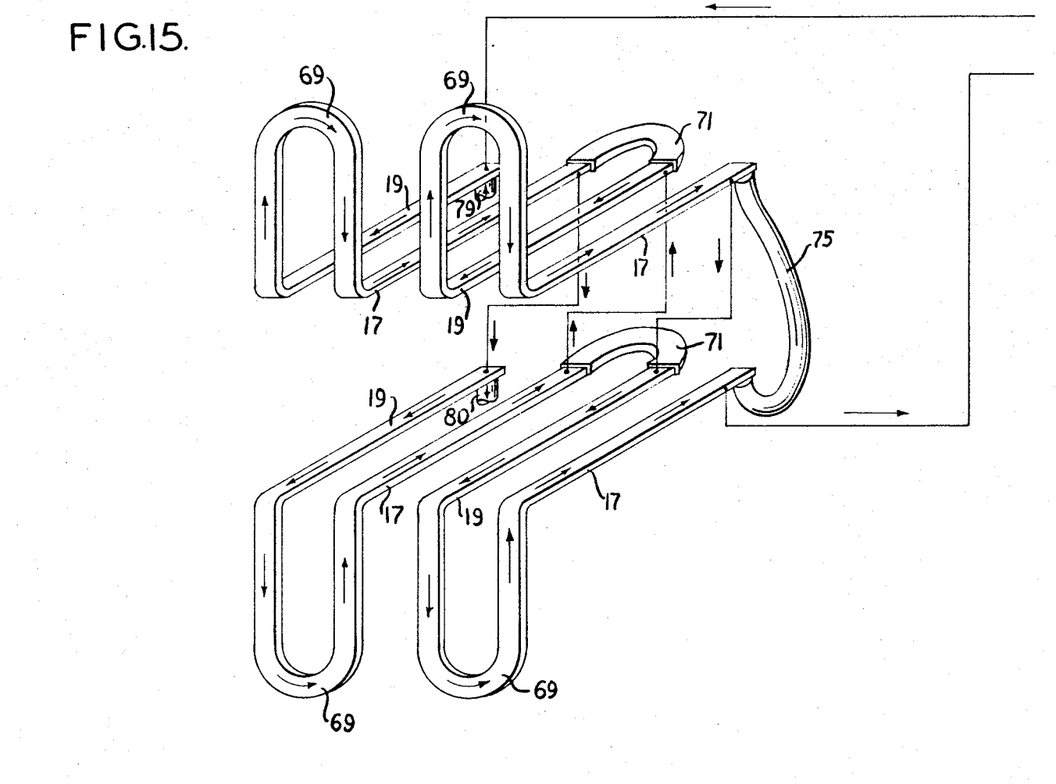
FIG. 15 is a skeleton view showing cooling and electrical arrangements for the structure shown in FIGS. 12–14.

As shown in FIG. 15, there are upper pairs of connected hollow reaches 17 and 19 of the conductors and lower pairs of connected hollow reaches 17 and 19 of the same. The pairs are connected by electrically conductive loops 69 and by electrically insulating flexible coolant carrying cross connections 71 as shown on FIG. 15. A flexible hose 75 provides a coolant connection between the upper and lower conductor assemblies. Inlet and outlet coolant passages are shown at 79 and 80. Connections for the flow of current are indicated by the wiring diagram in FIG. 15. The current flow is as indicated by the darts and the serial flow of coolant through the conductors between the coolant inlet 79 and outlet 80 will be obvious.

Insulating clamp bars 73 hold the upper and lower conductor assemblies on insulating crossbars 76 (FIGS. 13 and 14). Thus, these assemblies may be vertically adjusted to provide desired spaces above and below the strip 1 of the conductor reaches 17 and 19. Across the upper and lower conductor reaches insulating plates 77 are attached.

Operation of the form of the invention shown in FIGS. 12-15 is like that described in connection with FIGS. 8-11, except that the conductor reaches 17 and 19 are vertically adjustable, and instead of segment adjustments being made in respect to two conductors, segment adjustments are made in gangs of the same for eight conductors. Thus, a greater length of the strip 1 may be heated at one time.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for induction heating of a moving conductive strip, comprising an electrical conductor extending crosswise of the moving strip to produce an alternating magnetic flux loop to intersect the strip in a portion of it extending from one margin toward the other, a flux-field-concentrating structure comprising a series of adjacent flux-field-concentrating segments extending in a general direction along the length of the conductor and in said flux loop, said segments being individually independently adjustable to and from the conductor and to and from the plane of the strip to effect variable concentrations of said flux loop through adjacent crosswise portions of the strip.

2. Apparatus according to claim 1, including means for adjusting the position of the conductor relative to the strip.

3. Apparatus for induction heating of a moving metal strip, comprising at least one pair of electrical conductors extending crosswise of the moving strip, the members of said pair being on opposite sides thereof and each carrying current in the same direction to produce an alternating magnetic flux loop to intersect the strip in a portion extending from one margin toward the other, a flux-field-concentrating structure for each conductor, each structure comprising a series of adjacent independently movable flux-field-concentrating segments, means for individually independently adjusting the positions of the segments, whereby at least one of the segments in each series may be positioned differently with respect to the conductors, the strip and to one another to effect different localized flux concentrations of said loop through adjacent crosswise portions of the strip.

4. Apparatus according to claim 3, including means for independently adjusting each of said conductors relative to the strip.

5. Apparatus for induction heating of a moving metal strip, comprising at least two pairs of electrical conductors extending crosswise of the strip, members of each pair being on opposite sides of the strip, the members of each pair carrying current instantaneously in the same direction and in the respective pairs carrying instantaneous currents in opposite directions to produce alternating magnetic flux loops to intersect the strip in portions crosswise from one margin toward the other of the strip, a flux-field-concentrating structure comprising a series of flux-field-concentrating segments extending generally along the length of each of said conductors and in said flux loops, means for independently adjusting the positions of each segment in each series relative to their respective conductors and the strips to effect different localized alternating flux concentraitons in said loops through adjacent crosswise areas of the strip.

6. Apparatus made according to claim 5, wherein the segments in adjacent series on each side of the strip are equal in number and have corresponding serial positions, and including ganging means connecting such corresponding segments for simultaneous equal adjustments thereof as a gang.

7. Apparatus according to claim 6, including means for circulating coolant through each gang.

8. Apparatus made according to claim 7, including means for independently adjusting the positions of the conductors on each side of the strip relative to the strip.

9. Apparatus made according to claim 7, wherein the coolant circulating means includes flexible connections for directing the coolant serially through several gangs.

10. Apparatus for induction heating of moving metal strip, comprising electrical conductors arranged crosswise to and on opposite sides of the moving strip to produce alternating magnetic flux loops through it, a field structure associated with each conductor, each field structure comprising a series of flux-field-concentrating segments arranged adjacent to one another and generally along the length of the respective conductor where it crosses the strip, each segment comprising a nonmagnetic support and a group of laminations in each support constructed of material which is highly permeable to magnetic flux, each of said group of laminations being slotted for reception of the associated conductor upon movement in approach thereto, and adjusting means for independently moving each segment to and from its adjacent conductor and substantially perpendicular to the strip to obtain individual flux concentrations and attenuations through the strip.

11. Apparatus for induction heating of moving metal strip, comprising a frame having opposite portions providing a passage for the strip, means for supporting a member of a pair of magnetic-flux-inducing electrical conductors on each of said frame portions, said conductors extending transversely to and on opposite sides of the strip to direct magnetic flux oppositely therethrough on opposite sides of the pair of conductors, paired rows of adjacently located independently movable bipolar flux-concentrating elements in the flux field, each row being associated with and extending along one conductor crosswise of the strip, each member of each row straddling its associated conductor, an adjusting means on the frame for each flux-concentrating element for holding the element in straddling position with respect to its conductor at a distance from the conductor and the strip which is different from that of at least one other element in the row of which the element is a member.

12. Apparatus according to claim 11, wherein each conductor support is adjustable.

13. Apparatus according to claim 12, wherein each adjusting means for each flux-concentrating element comprises at least one screw to provide continuous variation of adjustment.

14. Apparatus according to claim 13, wherein there are several pairs of conductors and several pairs of rows of the flux-concentrating elements.

15. Apparatus according to claim 14, wherein individual members in adjacent rows of different pairs of rows of the flux-concentrating elements are gang-connected for simultaneous adjustments.

References Cited
UNITED STATES PATENTS

| 2,419,116 | 4/1947 | Cassen et al. | 219—10.61 X |
| 2,902,572 | 9/1959 | Lackner et al. | 219—10.61 X |
| 3,008,026 | 11/1961 | Kennedy | 219—10.61 |
| 3,031,555 | 4/1962 | Ross et al. | 219—10.61 X |

RICHARD M. WOOD, *Primary Examiner.*

L. H. BENDER, *Assistant Examiner.*

U.S. Cl. X.R.

219—10.79; 252—404; 260—45.95, 53